United States Patent [19]
Brewis et al.

[11] Patent Number: 5,671,953
[45] Date of Patent: Sep. 30, 1997

[54] PIPE END FITTINGS

[75] Inventors: Roderick Charles Brewis, Ranmore Cottage, Norton St. Philip, Somerset BA3 61Q; Steven James Kent, Cleveland, both of England

[73] Assignees: Roderick Charles Brewis, Somerset; Pipe Equipment Specialists Limited, Cleveland, both of England

[21] Appl. No.: 612,957

[22] PCT Filed: Sep. 12, 1994

[86] PCT No.: PCT/GB94/01980

§ 371 Date: Mar. 11, 1996

§ 102(e) Date: Mar. 11, 1996

[87] PCT Pub. No.: WO95/07430

PCT Pub. Date: Mar. 16, 1995

[30] Foreign Application Priority Data

Sep. 10, 1993 [GB] United Kingdom ............ 9318777

[51] Int. Cl.$^6$ .................................. F16L 33/20
[52] U.S. Cl. .................. 285/258; 285/382.5; 29/507
[58] Field of Search .................. 285/258, 382.5, 285/256, 382.4; 29/507, 523

[56] References Cited

U.S. PATENT DOCUMENTS

| 1,753,005 | 4/1930 | Grady | 285/258 |
| 2,071,478 | 2/1937 | Wilk | 285/258 |
| 2,146,756 | 2/1939 | Miller | 285/258 |
| 2,228,018 | 1/1941 | Scholtes | 285/258 |
| 2,735,473 | 2/1956 | Diget | 285/258 |
| 2,766,804 | 10/1956 | Kaiser | 285/258 |
| 2,947,409 | 8/1960 | Dodge | 285/258 |
| 3,490,793 | 1/1970 | Wagner | 285/258 |
| 3,575,447 | 4/1971 | Merkle | 285/258 |

FOREIGN PATENT DOCUMENTS 589587  6/1947  United Kingdom .............. 285/258

*Primary Examiner*—Eric K. Nicholson
*Attorney, Agent, or Firm*—Larson and Taylor

[57] ABSTRACT

An end fitting, particularly a pipe towing head, has an expandable element (44; 144) that is surrounded by a skirt (18) of a tubular body (14), so that a pipe end portion can be gripped between them. The element may have pipe gripping ribs which get less aggressive rearwardly, since the element is expandable by a mandrel (45) that leads to the greatest expansion at the rear.

16 Claims, 4 Drawing Sheets

PIPE END FITTINGS

TECHNICAL FIELD

The present invention relates to pipe end fittings. It particularly relates to towing heads and pressure test sets for connection to pipes (or other at least partly tubular objects).

Towing heads may be useful in pipe laying and in directional drilling. For example, a hole for a pipe may be produced, e.g. under a road, by means of a drill string. This is then connected to a reamer and pipe and drawn back. High pressure mud is pumped down the drill string and through the reamer during the drill and reaming operations. The reamer enlarges the hole to accommodate the pipe. However in the process the pipe is subject to considerable stresses. It risks being damaged or detached. Even if neither of these happens, mud may be forced into its interior, necessitating cleaning before use, especially if it is for use as a water supply pipe.

BACKGROUND ART

A known type of pipe towing head employs a threaded shaft with a towing eye at one end. The shaft passes through an expandable element, and engages a tapered expansion mandrel. In use, a pipe is passed onto the head so as to surround the expandable element. Rotation of the shaft draws the mandrel further into the expandable element, causing it to expand radially and grip the bore of the pipe. The pipe-engaging surface of the expandable element has annular ribs of sawtooth section for gripping the pipe. Thus a strong connection can be attained quite easily. This is generally sufficient for normal pipe laying processes. But when very high forces are involved, e.g. in directional drilling processes, it may not suffice. The mandrel can be drawn up further to apply greater force to the pipe, but this increases the risk of splitting the pipe. Further problems are caused by the fact that the internal diameters of nominally identical pipes can vary quite considerably. Furthermore pipes of different wall thickness are used for different purposes, so that pipes of the same outside diameter may have very different internal diameters. Such problems are also relevant to other end fittings, e.g. to pressure test sets which must be couplable to pipes and the like with reliable sealing.

DISCLOSURE OF THE INVENTION

According to the invention there is provided an end fitting for a tubular element having:

a threaded elongate element, a tubular body having a front portion with a bore through which the elongate element extends and a rear portion defining a skirt;

an expandable element which, in use, is located around the elongate element and at least partly radially within the skirt; and an expansion mandrel having a threaded bore engageable by the thread of the elongate element, so that, in use, the mandrel can be drawn forwardly to urge expansion of the expandable element by relative rotation of the elongate element.

Generally, the diameter of the expandable element in a non-expanded state will be less than the internal diameter of the skirt (at least at a rear portion) and at least in part less than the internal diameter of a pipe to be engaged. Thus a pipe can be engaged over at least part of the expandable element whose subsequent expansion causes the pipe to be engaged between the element and the skirt.

Preferably the skirt has sealing means on its radially inner surface for sealing to a pipe. Since the external diameters of pipes are normally accurately controlled in manufacture, this leads to reliable sealing. A single end fitting is suitable for use with a range of pipes with different internal diameters.

Generally the expandable element has radial projections such as circumferentially extending ribs (e.g. complete or partial annular ribs) that engage the pipe as it expands. Since the rearward ribs tend to be forced more strongly against a pipe than the forward ones, a rearward rib may be shaped and/or dimensioned so as to be less inclined to cut into a pipe.

The end fitting may be a towing head, in which case the elongate element may be a threaded bolt, typically having an engagement formation such as an eye at its front end. A towing head's body normally has a tapered front portion. There may be separate front and skirt portions. They may be connected by a screw-threaded connection. Of course the handedness of the thread should be such that the parts do not tend to become unscrewed in use.

Components of a towing head may be used as a pressure test set by passing a tubular stem through the body instead of the threaded bolt.

The invention will now be described in more detail, by way of example, with reference to the accompanying drawings.

MODES FOR CARRYING OUT THE INVENTION

Figure 1:
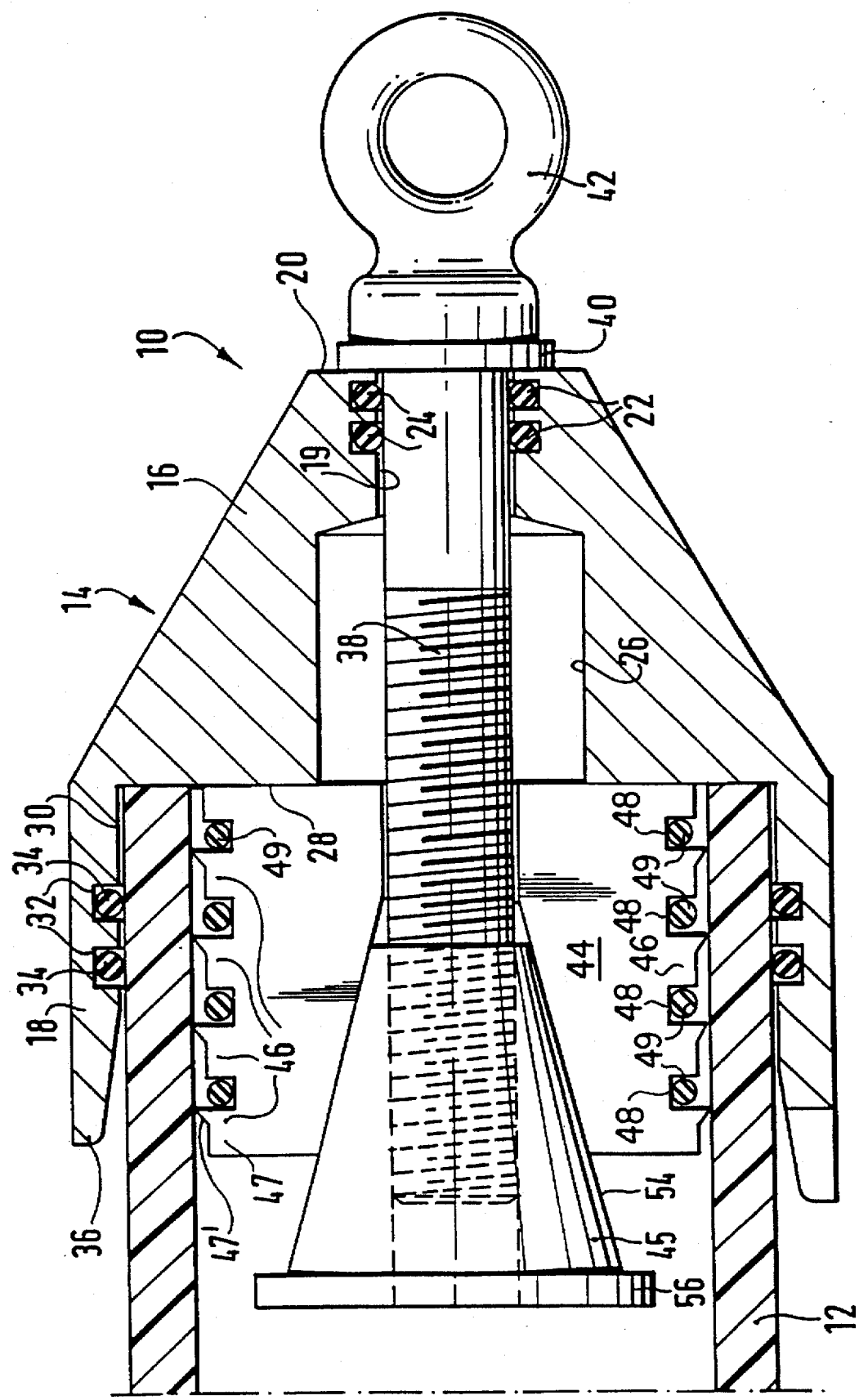
FIG. 1 is an axial section of a pipe towing head embodying the invention, engaging a pipe.

FIG. 1 shows a pipe towing head 10 engaging a pipe 12. The head has a tubular body 14, having a front frusto-conical portion 16, and a rearwardly extending skirt portion 18. The front portion 16 has a bore 19 extending from its front face 20, with two annular cavities 22 for O-rings 24. The bore 19 widens into an enlarged section 26, leading to a rearwardly facing axial face 28. The skirt 18 extends rearwardly of the face 28, initially with a portion of uniform internal bore 30, with one or more annular recesses 32 for sealing rings 34. At the rear, the inner surface of the skirt is angled outwardly, to produce a tapered rear portion 36, so that the skirt has an enlarged mouth to facilitate engagement of a pipe 12.

Figure 2:
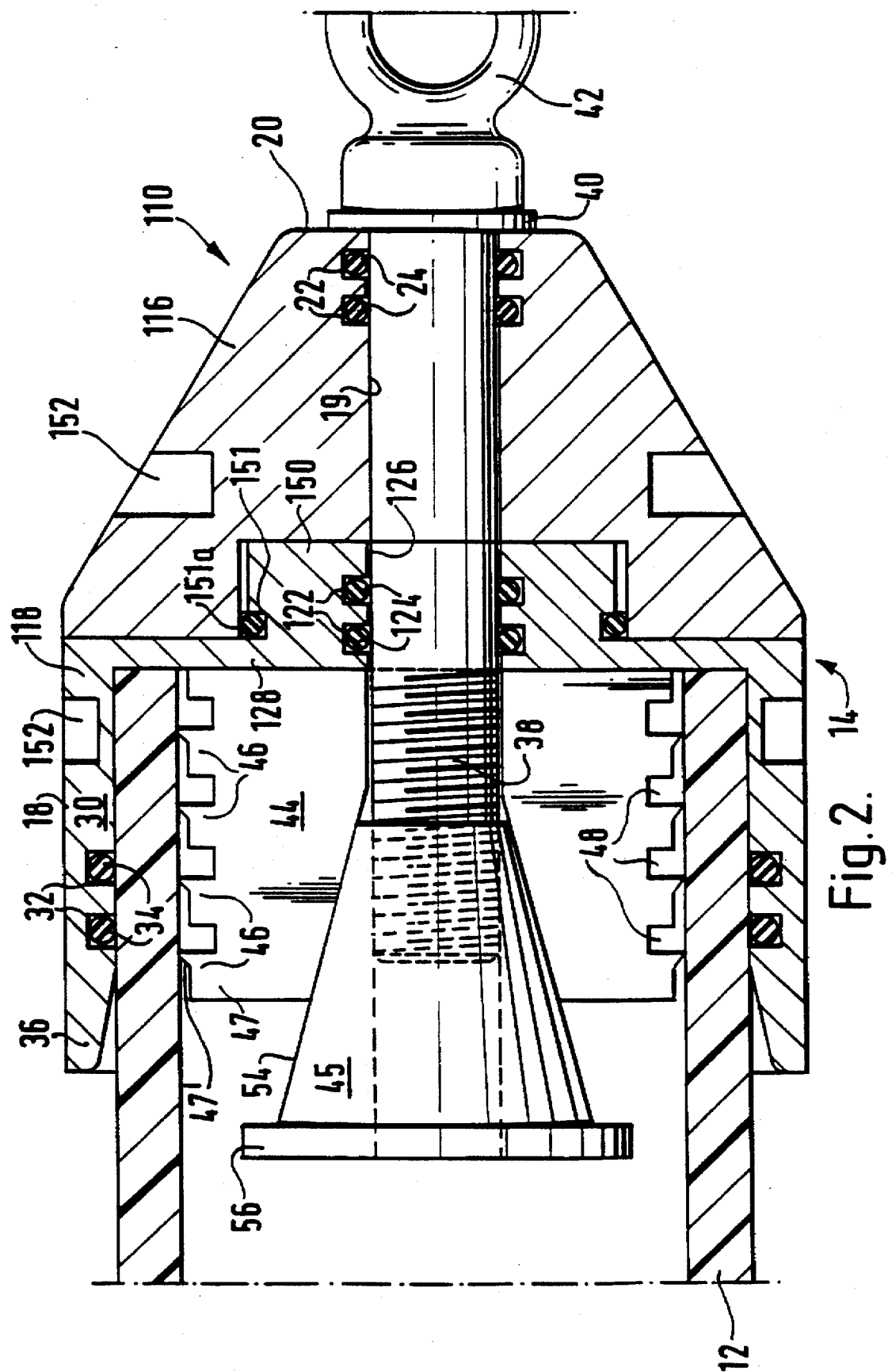
FIG. 2 is a view similar to FIG. 1 but showing a second embodiment.

The towing head 110 shown in FIG. 2 is generally similar, and corresponding components are labelled with corresponding reference numbers. It differs primarily in that the body 14 is formed in two parts, the skirt 18 being provided by a skirt member 118. This has a base portion 128 from which the skirt proper extends. The base portion 128 has a central bore 126 which is continuous with the bore 18 in the head portion 116. It has annular recesses 122 for sealing rings 124. The base portion 128 has a forwardly protruding boss portion 150 which is threaded for engagement in a complementary recess in the head portion 116. There is an annular recess 151 at the rear end of the box 150, having a sealing ring 151a. The head portion 116 and skirt portion 118 may have external recesses 152 which may be engaged by tommy bars to assist in separating and reconnecting the components 116, 118. The head portion 116 may be formed of a light material e.g. an aluminium alloy, to reduce weight. The skirt portion (or the complete body of the FIG. 1 embodiment) is suitably of steel.

Figure 4:
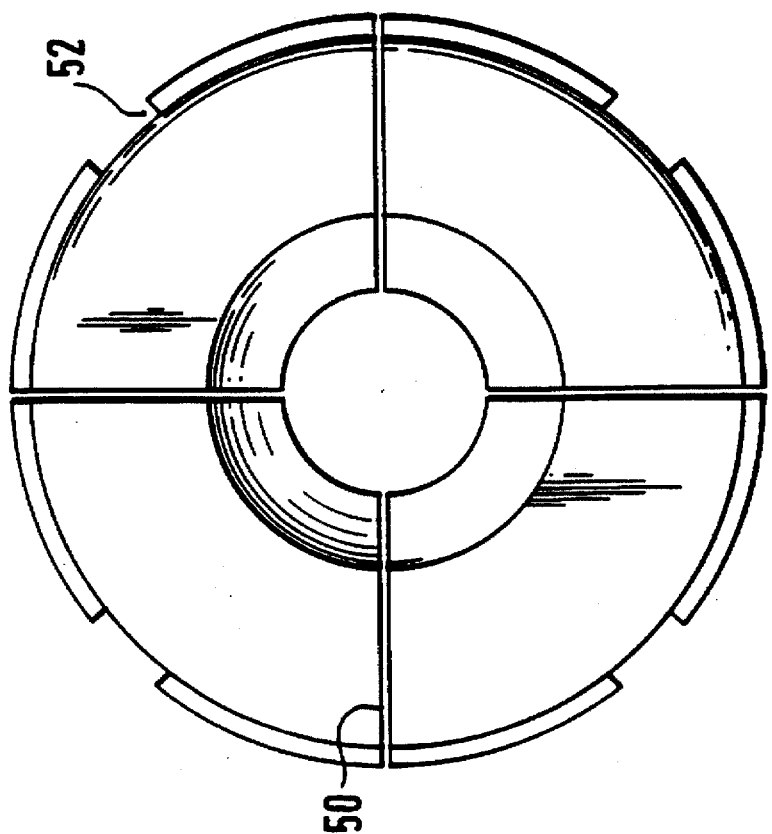
FIG. 4 is an axial end view of an expandable element usable in any of the illustrated embodiments.

In both embodiments, there is a central threaded bolt 38 that extends through the bores in the head 16, 116. It protrudes at the front where there is an enlarged shoulder 40 that abuts the front of the body; and there is a towing eye 42. The rear of the threaded bolt extends within, and may project beyond, the skirt. It passes through an expandable element 44 and engages an expansion mandrel 45. The expandable element 44 has the form of a cylindrical tube whose outer surface is formed with ribs 46, with cutting profiles. Each rib has a main body 47 of rectangular section, and a sawtooth section 47' projecting from the front thereof. There are channels 48 between the ribs 46. The tube is divided into four sectors by slots 50 (see FIG. 4. These extend for the full length of the tube, and the sections are retained together by resilient O-rings 49 (shown only in FIG. 1) in the channels 48. As also shown in FIG. 4, the ribs 46 may be interrupted by gaps 52. The tube has a bore which, at least at the rear, widens rearwardly.

The expansion mandrel 45 has a frusto-conical surface 54, complementary to the tapered bore of the expandable member. At the rear, there is an enlarged stop 56. The mandrel has a threaded bore engaged by the thread of the shaft 38.

FIGS. 1 and 2 show a pipe 12 that has been engaged with the towing head 10, 110. Thus the end of the pipe abuts the axial face 28, and it embraces the expandable member 44 and the mandrel 45. Rotation of the shaft 38, by means of the towing eye 42, causes the mandrel 45 to be drawn forwardly, urging expansion of the expandable member 44, so that the toothed ribs 46 are urged outwardly into the pipe. The pipe is sandwiched between the expandable member 44 and the skirt 18. Its outer surface is sealingly engaged by the O-rings 34 in the sleeve.

If the pipe is of thin material, there might be a risk that the ribs biting in would weaken it, which could lead to pipe breakage in a small number of cases. The presence of gaps 52 in the ribs as shown in FIG. 4 much reduces this risk, since it ensures that there are undamaged strips of pipe.

Figure 5:
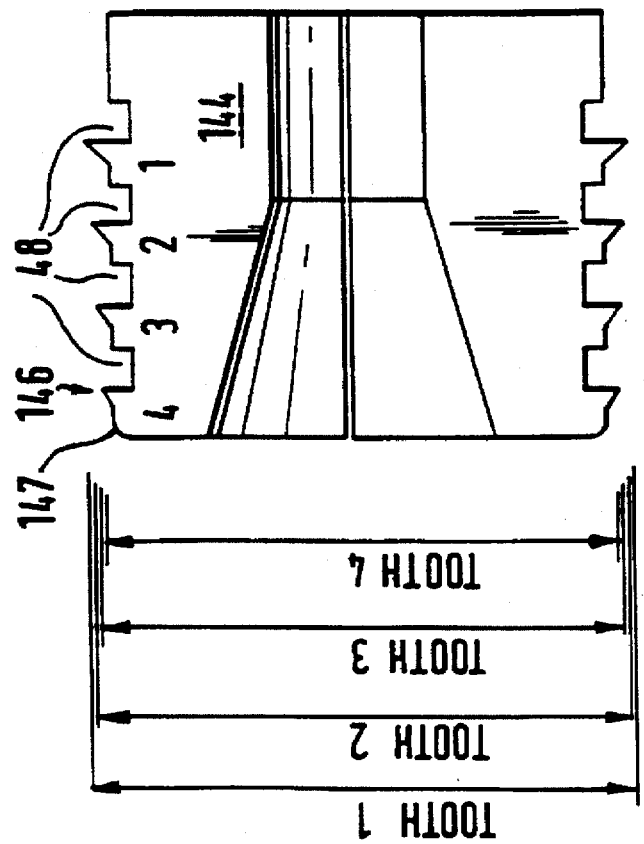
FIG. 5 is an axial section through a modified form of expandable element.

The expansion of the expandable element 44 happens progressively from the rear. Thus there is a tendency for the ribs at the rear to be pushed particularly deeply into the pipe. The flare of the rear of the skirt allows slight expansion of the pipe in this region, reducing the risk of damage. A further way of reducing risk is shown in FIG. 5. This shows an expandable member 144 which differs from that shown in FIGS. 1 and 2 in that the rearmost rib 146 is less "aggressive" than the other ribs, in that its saw tooth profile is lower. (In some cases, it could be a flat rib.) As shown, the height of the sawtooth sections may increase progressively from rib to rib.

Another safety feature shown in FIG. 5 is that the element 144 terminates rearwardly with a radiused profile 147. This much reduces the stress on a pipe engaged over the expanded element. With a sharp corner as shown in FIGS. 1 and 2, there is a risk of necking.

Figure 3:
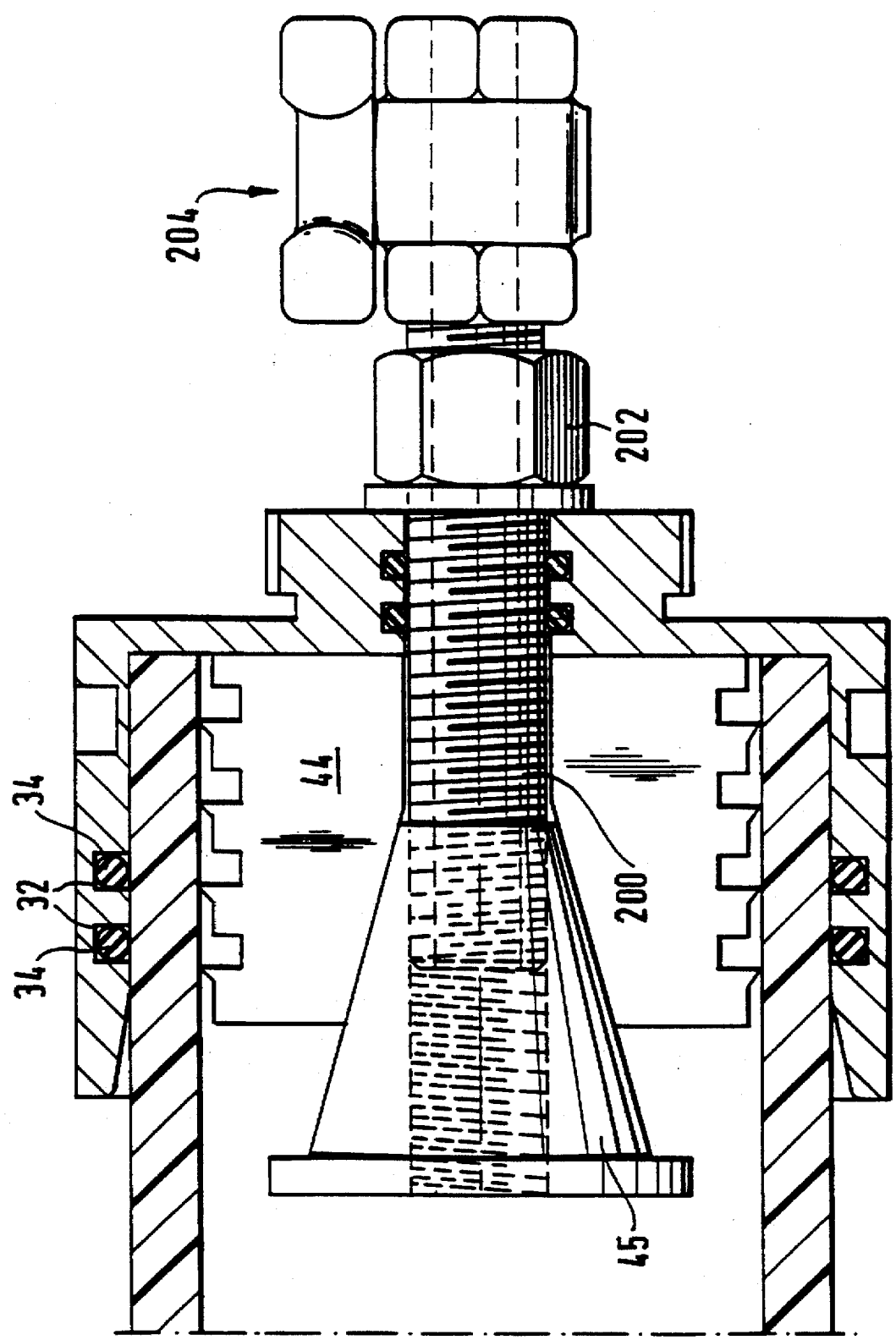
FIG. 3 is a view similar to FIG. 2 but showing the pipe towing head adapted as a pipe test set.

FIG. 3 shows a further use of parts of the towing head. It shows a head of the type shown in FIG. 2, with the front portion 116 removed, and the threaded shaft 38 removed. The shaft has been replaced by a threaded pipe stem 200. At the front, it has a hexagonal collar 202, leading to a pipe connection mounting 204. Of course, the same idea can be applied to a head as shown in FIG. 1, without a removable front portion.

We claim:

1. An end fitting for a tubular element having:
   a threaded elongate element,
   a tubular body having a front portion with a bore through which the elongate element extends and a rear portion defining a skirt;
   an expandable element which, in use, is located around the elongate element and at least partly radially within the skirt, said expandable element being tubular having a tube body which is divided into a multiplicity of separate body pieces by slots extending the full axial length of the tube body; and
   an expansion mandrel having a threaded bore engageable by the thread of the elongate element so that, in use, the mandrel can be drawn forwardly to urge expansion of the expandable element by relative rotation of the elongate element.

2. An end fitting according to claim 1 in which, prior to expansion of the expandable element, there is an annular space between the element and the surrounding skirt for receiving an end portion of a tubular element to which the fitting is to be connected.

3. An end fitting according to claim 1 wherein the skirt has sealing rings on its radially inner surface.

4. An end fitting according to claim 1 wherein the expandable element has circumferentially extending ribs for engaging a tubular element when the fitting is connected to it.

5. An end fitting according to claim 4 wherein the ribs are discontinuous, said ribs being interrupted by gaps on the body pieces as well as by the slots separating the body pieces.

6. An end fitting according to claim 4 wherein, in the unexpanded state of the expandable element, said expandable element has one or more ribs at a rearward region remote from said front portion of said tubular body, said ribs terminating radially spaced within a notional cylinder tangent on one or more ribs at a forward region adjacent said front portion of said tubular body.

7. An end fitting according to claim 4, wherein the ribs comprise sawtooth sections, and wherein the height of the sawtooth section of the rib most remote from said front portion of said tubular body is less than the height of the sawtooth section of a rib located less remote from said front portion.

8. An end fitting according to claim 6 wherein the height of successive ribs increases progressively towards the front of the element.

9. An end fitting according to claim 1 wherein the radially outer surface of the expandable element terminates rearwardly with a radiused profile.

10. An end fitting according to claim 1 wherein said front and rear portions of said tubular body are provided by separate elements which are detachably connected.

11. An end fitting according to claim 1 wherein a rearward portion of the skirt remote from said front portion of said tubular body has a radially inner surface which increases in diameter in a direction away from said front portion of said tubular body.

12. An end fitting according to claim 1 wherein the elongate element carries a towing member at an end thereof adjacent the front portion of said tubular body.

13. An end fitting according to claim 1 wherein the elongate element comprises a tubular stem having a pipe connector at an end thereof adjacent the front portion of said tubular body.

14. An end fitting according to claim 1 having interchangeable elongate elements comprising a bolt for configuring the fitting as a towing head, and a tubular stem for configuring the fitting as a pressure test set.

15. An end fitting according to claim 1 wherein said expandable element includes resilient members which embrace the tube body and retain the body pieces together.

16. An end fitting according to claim 15 wherein said resilient members comprise O-rings.

* * * * *